United States Patent

Crippa et al.

[15] 3,697,969

[45] Oct. 10, 1972

[54] MAGNETIC TAPE WITH PLURAL CLOCKS

[72] Inventors: Eugene R. Crippa, El Cajon; Ray B. Lowry, San Diego, both of Calif.

[73] Assignee: The United States of America as represented by the Secretary of the Navy

[22] Filed: Nov. 29, 1971

[21] Appl. No.: 202,815

[52] U.S. Cl.......................340/174.1 A, 179/100.2 S

[51] Int. Cl...........................G11b 5/44, G11b 27/10

[58] Field of Search..340/174.1 A, 174.1 B, 174.1 G, 340/174.1 H; 179/100.2 MD, 100.2 S

[56] References Cited

UNITED STATES PATENTS 2,963,555 12/1960 Brubaker............340/174.1 B 2,854,526 9/1958 Morgan...............340/174.1 B

*Primary Examiner*—Vincent P. Canney
*Attorney*—R. S. Sciascia et al.

[57] ABSTRACT

Tape recorder apparatus compatible in communications systems with cryptographic units which are generally adversely affected by excessive tape jitter and speed variations. Long term, gross tape speed control is provided by a high-compliance, low-mass drive system which follows inversely synchronization (sync) data recorded on the tape. Data tones are demodulated and clocked into an input register at the recorded sync rate. By means of fine dump control, while the input register is accumulating, an outputting register precisely clocks out bits at a rate acceptable to the interface units. The registers are alternately switched from accumulate to dump function.

3 Claims, 3 Drawing Figures

INVENTOR.
EUGENE R. CRIPPA
RAY B. LOWRY
BY
George J. Rubens

INVENTOR
EUGENE R. CRIPPA
RAY B. LOWRY
BY
George J. Rubens

INVENTOR.
EUGENE R. CRIPPA
BY RAY B. LOWRY

George J. Rubens

MAGNETIC TAPE WITH PLURAL CLOCKS

BACKGROUND OF THE INVENTION

In some Navy communications systems, digital type recorders interface with cryptographic units. These units can degrade over-all system performance if (1) they are of the type which stay in sync as long as the incoming bit-rate is within the sync window even when significant numbers of bits are lost during the transmission; or (2) they do not recover sync if data rate drifts or falls out of the sync window.

Consequently, the present invention comprises novel digital tape recorder apparatus which takes advantage of the above interface unit characteristics to minimize system degradation caused, for example, by excessive speed variations, and which achieves the above without requiring an expensive, highly-precise, stable tape transport or precise standardization of tape speed, as is characteristic of the prior art.

SUMMARY

Digital type recorder apparatus compatible in communication systems with cryptographic interface units are disclosed. The apparatus features means for minimizing system operational degradation which can occur due to excessive tape jitter and tape speed variations. Essentially, tape speed variations are regulated by modest speed control and buffering techniques. A clock which is synchronized with data being recorded is recorded with the data, and the reproduced recorded clock is used to shift the recorded data into a buffer logic circuit. An offset, auxiliary sync reproduce head provides "spongy lock" tape control during reproduce mode operation by comparing the recorded clock with an output clock and with the condition of the data register. Output data is dumped into interface units at a very precise rate determined by the mean bit rate of the interface units.

STATEMENT OF THE OBJECTS OF INVENTION

The primary object of the novel apparatus disclosed herein is to advance the pertinent art by providing digital tape recorder apparatus which can be effectively integrated in communications systems having cryptographic interface units.

Other objects, advantages and novel features of the invention will become apparent from the following detailed description of the invention when considered in conjunction with the accompanying drawings.

DESCRIPTION OF THE PREFERRED EMBODIMENT

Figure 1:
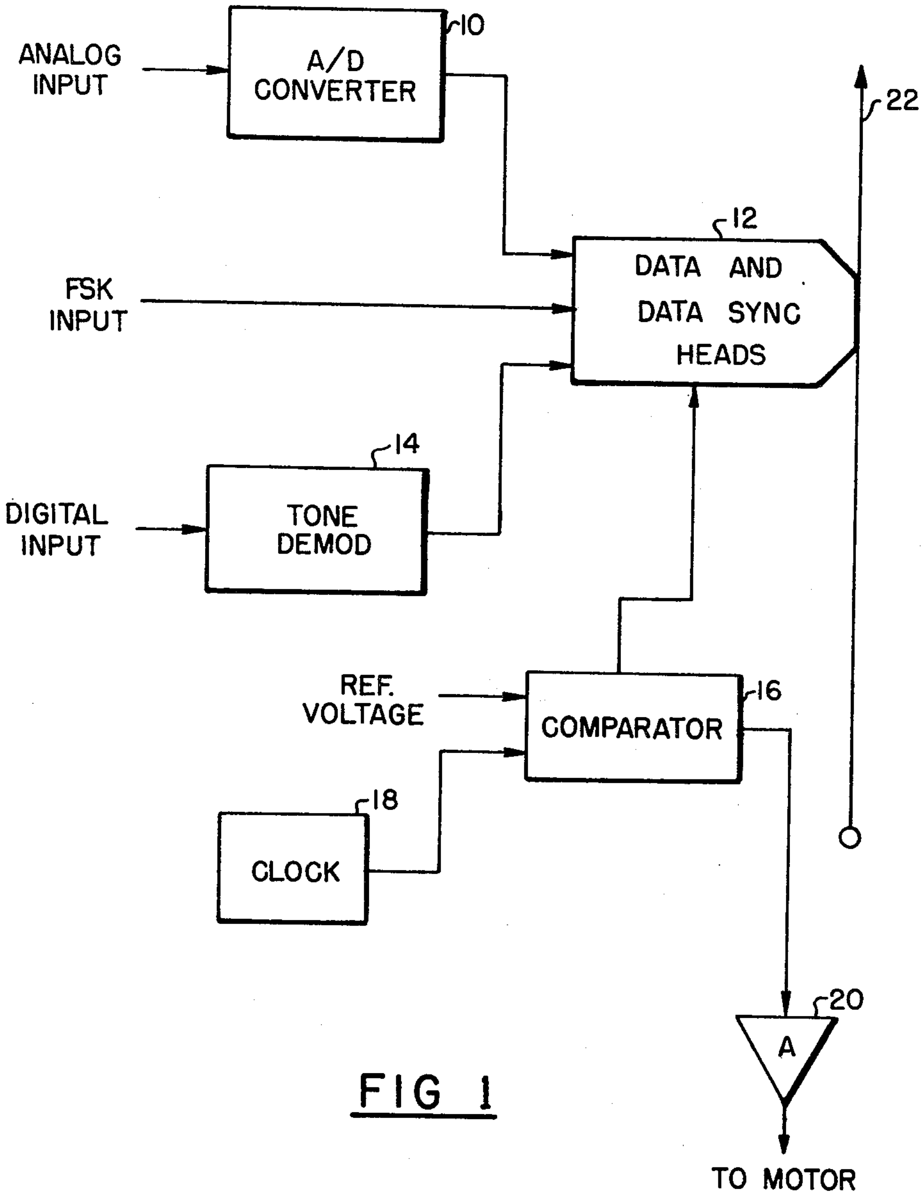
FIG. 1 is a simplified electrical schematic of the preferred embodiment of the present invention in the record mode.

FIG. 1 is a simplified electrical schematic of the novel apparatus in the record mode of operation. In the record mode, the device can accept analog, FSK, or digital inputs.

Analog inputs are converted to digital signals in an A/D converter 10 and then coupled to the data and data sync heads 12 which are colocated with respect to each other. FSK inputs are fed directly into the data and data sync heads, and digital inputs are coupled through a tone demodulator 14 to the data and data sync heads.

The heads 12 also receive an input from a comparator 16 which accepts a reference voltage and a clock signal from the input clock 18. The comparator 16 also feeds a motor drive amplifier 20 which is connected to the recorder motor apparatus (not shown) in a motor control servo circuit.

Data and data sync clock are recorded on the magnetic recording tape 22 which travels during record in the direction indicated by the arrow.

Figure 2:
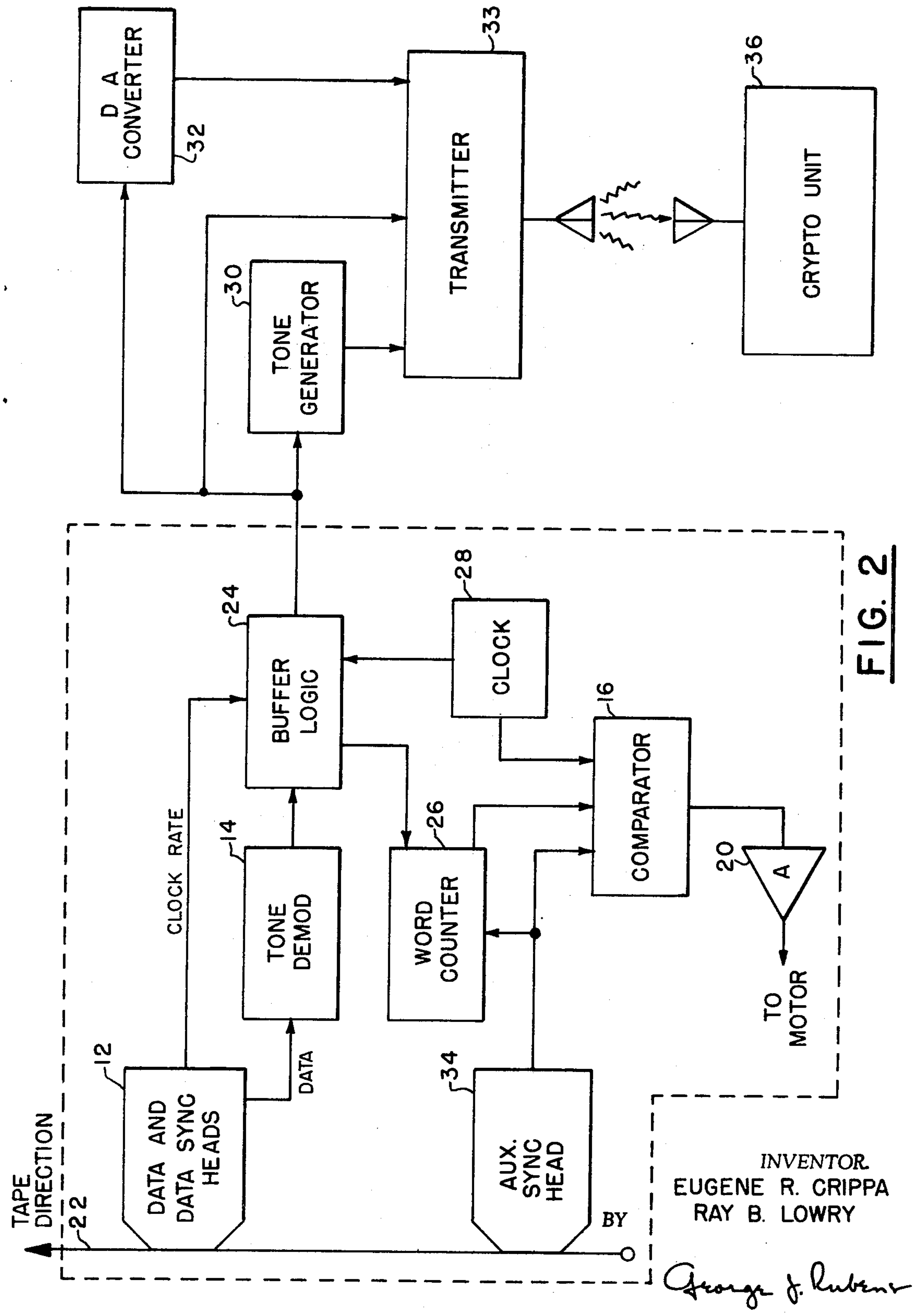
FIG. 2 is a simplified electrical schematic of the preferred embodiment of the present invention in the reproduce mode.

FIG. 2 illustrates schematically the present invention in the reproduce mode. Recorded data and data clock on the tape 22 are coupled to the data and data sync heads 12. The recorded clock is fed directly from the data sync head to the buffer logic 22. Recorded data, however, is first passed through a tone demodulator 14 and then to the buffer logic 24.

The buffer logic 24 feeds an output to the word counter 26 and receives a clock signal from the output clock source 28. The buffer logic outputs the bits in digital, FSK, or analog form. FSK outputs are coupled through a tone generator 30 for transmission to interface units, and digital outputs are transmitted directly or first converted to analog in the D/A converter 32.

An offset, auxiliary motor sync head 34 is also shown in FIG. 2. Its output is fed to the word counter 26 and to the comparator 16. Its operation will be discussed in detail hereinafter.

As previously discussed, excessive tape jitter can cause bit time variations which can result in the cryptographic units 38 dropping out of sync and transmitted data thereby being lost.

The recorder essentially eliminates the above problem by buffering the tape output in the buffer logic circuit 24 and then dumping out the stored data at a precisely controlled clock rate from the output clock 28.

A clock from the input clock 18 is synchronized and recorded with the incoming data to be recorded as shown in FIG. 1, and the reproduced recorded clock is used to shift the recorded data into the buffer logic register 24 as shown in FIG. 2.

Figure 3:
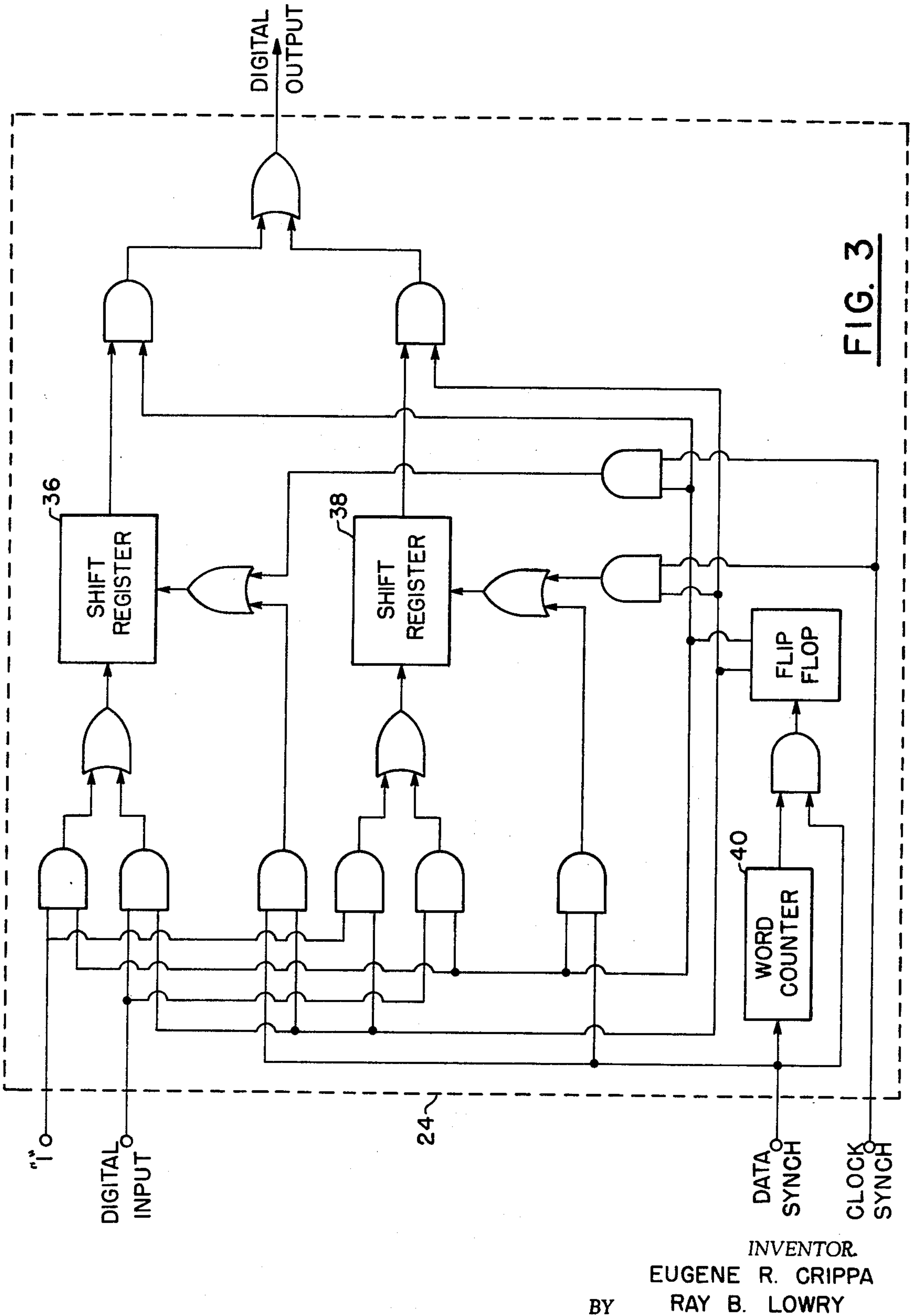
FIG. 3 is a simplified electrical schematic of the buffer logic circuitry shown in FIG. 2.

The buffer logic 22 which is essentially a bit storing and sequencing unit is shown in detail in FIG. 3. In operation, the input register 36, which accumulates, is clocked at the sync reference speed which is recorded on the tape to maintain the register locked in step with the input bit rate.

While this register is accumulating, the output register 38 is dumping buffered bits at a precise bit rate that should always fall within the interface unit sync window, i.e., at a rate determined by the cryptograph unit mean bit rate. This timing is provided by the clock 28 which can comprise a precision crystal frequency source. The word counter 40 accepts data sync to provide the shift information to switch the operational position of the register 36 to the register 38 and vice-versa. The counter also instructs the registers to dump before they are fully filled as accumulating registers to preclude loss of bits.

With reference to FIG. 2, it can be seen that an auxiliary offset motor sync head 34 provides tape speed control during the reproduce cycle by comparing a recorded speed control frequency or clock with an output clock 18 and the condition of the buffer logic register 22 as indicated by the word counter 26.

The above tape speed control mechanism maintains the register circuitry in the buffer logic at selectively predetermined set fill level. Furthermore, it functions as a "spongy lock" between the input and output to thereby eliminate the necessity of having a precision type tape drive system. Operationally, the mechanism provides gross tape speed control and a fine dump control at the output. Ideally the tape speed is maintained at a speed which produces an inputting bit rate slightly under the outputting bit rate to preclude accumulator spillover.

It should be noted that the offset head 34 used during the reproduce mode is physically located ahead of the data and data sync heads 12, relative to the tape direction. The offset head compensates for the lag in response control due to the dynamic hysteresis of the tape speed control loop.

It can thus be appreciated that the apparatus provides gross control of long-term tape speed control by means of a high-compliance, low-mass tape speed drive system that follows inversely the sync information recorded on the tape. Data tones are demodulated and clocked into a register in the buffer logic 24 at the recorded sync speed.

The above mentioned gross tape speed control and fine dump control are tied together by the "spongy lock" also mentioned earlier to provide a novel recorder apparatus having the following improved operational characteristics as compared to the prior art.

Instead of using a highly-balanced, large, rotating mass, precision drive system for maintaining constant tape speed, the recorder uses a low-mass, high-compliance drive system which follows inversely the speed changes derived from the sync track.

Instead of deriving recorder motor drive information from a stable frequency source whose output is modified by sync input for precision tape speed control, the present recorder is driven directly from the recorded sync information for inverse incremental speed modifying control; consequently it does not require precise tape speed control. Its sole function is to smooth out the long-term tape speed changes, start to finish, tape deck to tape deck.

Instead of having an output bit rate which is tied directly to the input by a high precision tape transport, the present invention has an output bit rate which is loosely tied to the input through the "spongy lock" between the input and output clocks.

Instead of having colocated data and sync heads, the present invention features an auxiliary sync head which is displaced a finite distance in front of the data and data sync heads. The distance separating the two is a function of the mass hysteresis of the tape drive to allow the tape drive (capstan) sufficient time to come up or down to the anticipated desired speed as the tape passes the data head. The offset head is used only during the reproduce cycle.

In operation, the tape can be provided with a reference signal track such as a 1 -KHz tone or frequency which is locked to the data bit rate. This tone is compared to the reference clock and the capstan RPM is adjusted to average the tape speed close to the desired bit rate speed. The output is dumped at the desired bit rate regardless of the input bit rate as long as it does not exceed the storage capacity of the register. If it does exceed the storage capacity, information bits are lost, but synchronization is maintained. It can thus be seen that novel digital recorder apparatus has been disclosed.

Obviously many modifications and variations of the present invention are possible in the light of the above teachings. It is therefore to be understood that within the scope of the appended claims the invention may be practiced otherwise than as specifically described.

For example, saturation recording techniques could be used whereby a signal conditioner could replace the tone generator and tone demodulator of FIGS. 1 and 2 whereby DC levels could be recorded directly on the tape after it is conditioned.

Furthermore, phase encoding techniques could be used to superimpose a sync signal on the data and thus eliminate the sync track.

What is claimed is:

1. Digital tape recorder apparatus for use with digital magnetic tape having recorded thereon digital data and a synchronous, selectively predetermined clock rate and comprising:
   - first and second colocated magnetic head means for reproducing said data and clock rate respectively;
   - data storage means connected to said first and second head means for receiving reproduced data at said recorded clock rate;
   - said data storage means including shift register means for buffering said reproduced data and for outputting the buffered data at a selectively predetermined bit rate;
   - output clock means connected to said shift register means for providing said selectively predetermined bit rate;
   - third magnetic head means located ahead of said first and second head means with respect to the direction of said tape during the reproduce mode;
   - comparator means connected to said third head means and said output clock for comparing the recorded clock rate with said output clock rate; and
   - motor control servo means connected to said comparator means and being responsive to the output thereof to maintain the speed of said tape at a selectively predetermined value.

2. The apparatus of claim 1 wherein said shift register means comprise two shift registers which alternately accumulate and dump data at said selectively predetermined output bit rate.

3. The apparatus of claim 1 further including means for demodulating said reproduced data before it is received at said data storage means.

* * * * *